T. C. ENTWISTLE.
Expanding Reed for Warping and Beaming Machines.

No. 221,799.  Patented Nov. 18, 1879.

Witnesses.
N. E. Whitney.
Jos. P. Livermore

Inventor.
Thomas C. Entwistle,
by Crosby & Gregory, Attys

UNITED STATES PATENT OFFICE.

THOMAS C. ENTWISTLE, OF HOPEDALE, MASSACHUSETTS.

IMPROVEMENT IN EXPANDING REEDS FOR WARPING AND BEAMING MACHINES.

Specification forming part of Letters Patent No. 221,799, dated November 18, 1879; application filed August 25, 1879.

*To all whom it may concern:*

Be it known that I, THOS. C. ENTWISTLE, of Hopedale, county of Worcester, State of Massachusetts, have invented an Improvement in Expanding Reeds or Combs for Warping and Beaming Machines, and for Slashers, of which the following description, in connection with the accompanying drawings, is a specification.

This invention relates to reeds or combs for warping and beaming machines, and for slashers.

In expanding reeds as now constructed the dents are held between the coils of a series of spiral springs, and the spaces between the dents are made more or less by expanding or permitting the springs to contract. These springs, at or near their ends beyond the dents, are connected with traveling nuts moved in opposite directions by a right and left threaded screw; but such springs, when expanded, stretch more at their ends than near the middle of their length, and consequently the dents at and near the selvage of the chain of warp are most separated, which is very objectionable, for the selvage should be the most compact part of the fabric.

To obviate this difficulty I have provided the screw with threads of different pitch, those nearest the central part of the screw being finer, and upon each different-threaded portion I place a nut, provided with a pin to enter the space between two dents, and by a series of such pins and nuts each side the center I am enabled to operate all the pins and nuts upon each side of the center of the screw simultaneously in the same direction, but at different speeds, those pins and nuts nearest the selvage moving, however, faster than those nearest the center of the screw.

In this way I am enabled to divide the whole number of dents into sections containing each a greater or less number of dents, move each section positively, and preserve almost exact uniformity of space between the dents of the reed from end to end under all its adjustments.

In this present form of my invention the slow-moving nut nearest the center of the reed is operated by a screw having thirty-two threads to the inch, and the faster-moving nut by a screw having sixteen threads to the inch, I having divided the reed-dents into four sections, two each side the center dents; but if I should divide the said dents into eight sections I should provide the screw each side its center with four sets of threads, each set toward the outer ends of the screw growing coarser by about one-fourth.

Figure 1:
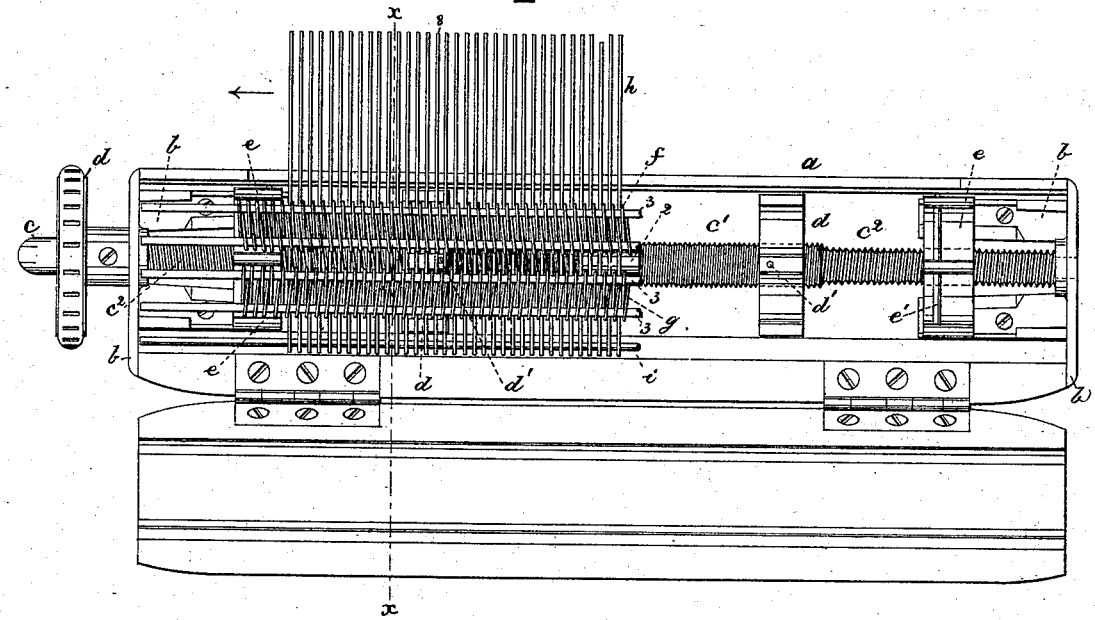
Figure 2:
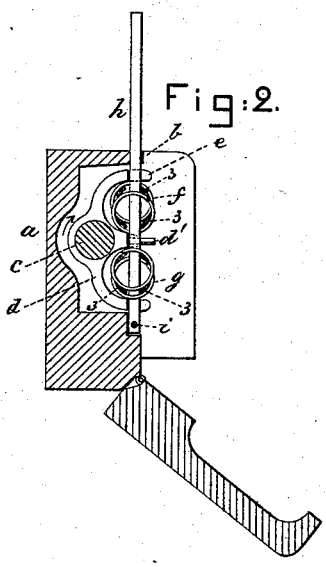

Figure 1 represents in front elevation a sufficient portion of the base of a reed to illustrate my invention, the dents and their holding-springs at the right being omitted to show the screw and nuts, it being understood that the screw-threads and nuts at the left-hand end of the screw are the same as those shown at the right, except that they are reverse-handed; and Fig. 2 is a section of Fig. 1 on the dotted line $x$ $x$.

Let $a$ be supposed to be the lower bar or cross-piece of the reed or comb, it being hollow to receive the metallic end pieces $b$, provided with proper bearings for the nut-moving screw-threaded shaft $c$, having a hand-wheel, $d$, by which to rotate it. This shaft $c$, each side its center 2, has screw-threads $c'$ $c^2$, those $c'$ being of less pitch than those $c^2$, and while the screw-threads shown at the right of the said center, as in Fig. 1, are left-hand threads, those at the left of the said center are right-hand threads.

It will be therefore understood that the threads of the said shaft $c$, each way from its center, are alike, except as to direction, one series being left-handed and the other right.

Upon the central or finer threads, $c'$, each side of the center of the shaft $c$, is a central or slow-speed nut, $d$, provided with a dent-engaging pin, $d'$, and upon each series of outer or coarser threads $c^2$ is a nut, $e$, having a pin, $e'$, which is extended through between the coils of the sets of spiral spring $f$ $g$, near their outer ends, there being two spiral springs to each set, all as common, the coils of one spring engaging those of the other, and the dents $h$ being passed through them, and being guided by a guide-rod, $i$, all as usual. The springs are held up by the usual spring-holding rods 3.

Rotation of the screw-shaft in the direction of the arrow, Fig. 2, will cause the pins $d'$ of nuts $d$ to act upon one of the dents—as, for instance, the one numbered 8, Fig. 1—and will move the said dent in the direction of the arrow, Fig. 1, and the dent 8, extended through the springs $f g$, will elongate them and expand the dents between the said dent 8 and the center of the reed.

The pin $e'$ of the more rapidly moving nut $e$ on the coarser thread $c^2$ will at the same time draw upon the ends of the springs just outside the selvage-dent, and will elongate the springs between the selvage-dent and the dent numbered 8, and will separate each dent of its section at the proper distance from the dents next to it.

I do not wish to limit my invention to placing the pin of the nut in contact with any one dent of the set or section of dents to be controlled by it, and the said pin may engage any dent at or near the dividing-dent of any two sets or sections of dents, there being, of course, a set of dents, or a certain number of dents, controlled by each of the two or more nuts each side the center of the screw-shaft.

I do not claim the dents, springs, and a screw-shaft having a right and left hand thread with a nut and pin to act only upon the ends of the springs.

I am also aware that two nuts have been used each side the center of the comb; but in such application the two nuts so employed are moved by a screw having a uniform thread, and while the outermost nut rests the other is moved toward it to compact the selvage-dents more closely than those near the center of the comb.

I claim—

1. In an expanding reed, the dents, their holding-springs $f g$, and a shaft having right and left handed threads of different pitches, as described, combined with a slow and a faster moving nut adapted to expand the springs and separate the dents by sections, substantially as described.

2. The dents and their holding-springs $f g$, a screw-thread, and a nut provided with a pin to engage a dent intermediate between the center and selvage dents, combined with a faster-moving screw-thread, and a nut, and pin to elongate the springs at their ends, substantially as described.

In testimony whereof I have signed my name to this specification in the presence of two subscribing witnesses.

THOS. C. ENTWISTLE.

Witnesses:
  G. W. GREGORY,
  N. E. WHITNEY.